A. E. NORRIS.
AUTOMATIC BRAKE.
APPLICATION FILED MAY 4, 1909.
1,123,786.
Patented Jan. 5, 1915.
2 SHEETS—SHEET 1.
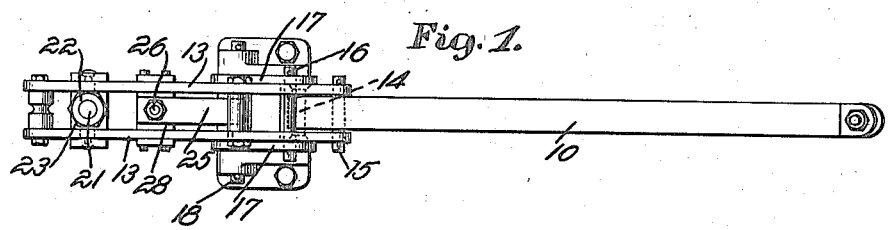
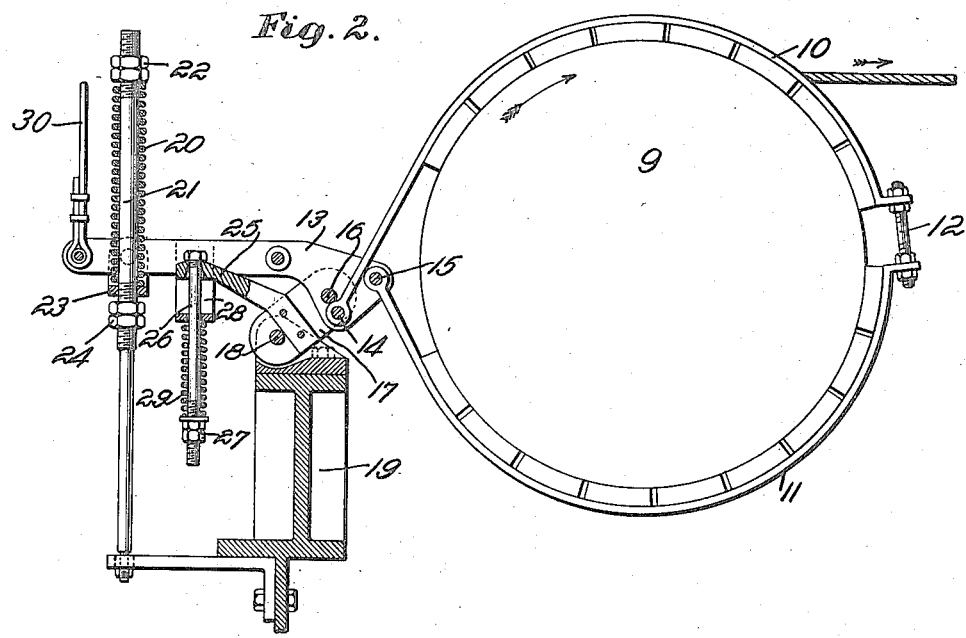
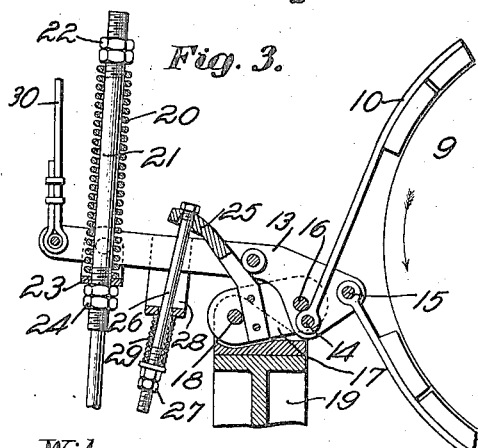
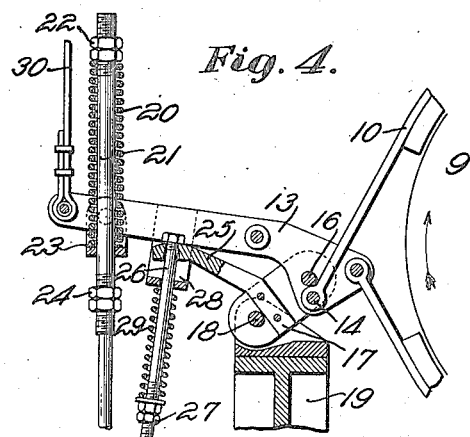
Witnesses:
Edwin T. Lure
Robert H. Kammler.
Inventor:
Almon E. Norris,
by Emery & Booth Attys.

A. E. NORRIS.
AUTOMATIC BRAKE.
APPLICATION FILED MAY 4, 1909.
1,123,786.
Patented Jan. 5, 1915.
2 SHEETS—SHEET 2.
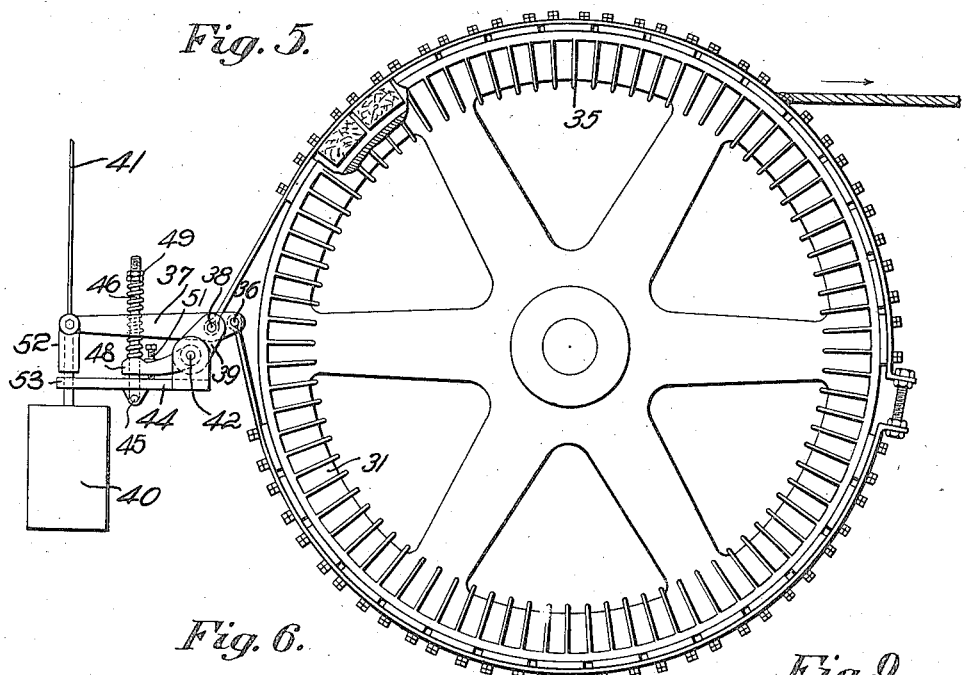
Fig. 5.
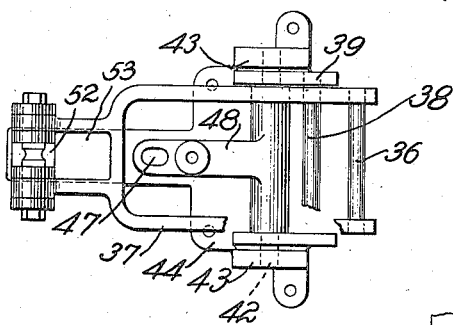
Fig. 6.
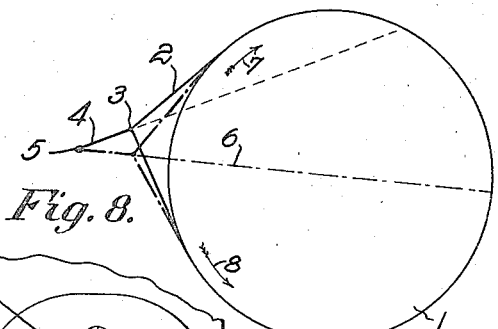
Fig. 9.
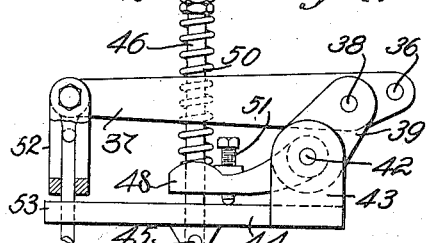
Fig. 7.
Fig. 8.
Witnesses:
Robert H. Kammler.
Horace H. Crossman.
Inventor:
Almon E. Norris,
by Emery & Booth
Att'ys.

UNITED STATES PATENT OFFICE.

ALMON E. NORRIS, OF CAMBRIDGE, MASSACHUSETTS.

AUTOMATIC BRAKE.

1,123,786. Specification of Letters Patent. Patented Jan. 5, 1915.

Application filed May 4, 1909. Serial No. 493,874.

*To all whom it may concern:*

Be it known that I, ALMON E. NORRIS, a citizen of the United States, residing at Cambridge, in the county of Middlesex and State of Massachusetts, have invented an Improvement in Automatic Brakes, of which the following description, in connection with the accompanying drawings, is a specification, like letters on the drawings representing like parts.

My invention relates to brakes being more particularly concerned with the provision of an improved form of brake adapted especially, although not exclusively, for use in connection with hoisting machinery.

This application as to the disclosures of Figures 1 to 4, inclusive, is a division of my prior application Ser. No. 404,068, filed November 27, 1907.

My invention will be best understood by reference to the following description when taken in connection with the accompanying illustration of one specific embodiment thereof, while its scope will be more particularly pointed out in the appended claims.

In the drawings: Fig. 1 is a plan view of a brake band and controlling levers, embodying one form of my invention; Fig. 2 is a sectional elevation of the same; Fig. 3 shows a different position of the brake and controlling levers; Fig. 4 shows still another position of the controlling levers; Fig. 5 is a side elevation of a modified form of brake; Fig. 6 is a plan view on a larger scale, partly broken away, showing the controlling levers for the band brake; Fig. 7 is a side elevation of the same; Fig. 8 is a section on an enlarged scale taken transversely through a portion of the brake band and brake drum; and Fig. 9 is an illustrative diagram.

In connection with hoisting machinery it is frequently desirable to provide a brake for controlling the movements of a rope-winding drum or other moving body, such that it will act to permit free rotation in one direction but will normally prevent movement in the opposite direction. Brakes permitting rotation in one direction but automatically preventing rotation in the opposite direction are well-known, an example of such being shown in prior Reissue Patent No. 12,040, granted to me September 30, 1902. It is frequently desirable, however, to control the action of such brakes so that, when desired, the brake may be released to permit rotation of the moving body in the direction in which its rotation is normally prevented. Herein I have provided a brake capable of being thus controlled and so arranged, that, on the one hand, while permitting free movement in the one direction, it may be tightly applied to prevent any movement whatever in the opposite direction or, on the other hand, may be frictionally applied to any desired graduated or partial extent to control the rotation of the drum in that same direction at any desired rate of speed.

Referring first to Fig. 9 I have there shown diagrammatically one way in which this may be accomplished. The brake drum or other body 1 has shown applied to it the brake band 2. The latter is shown as having both ends attached at 3 to the link 4 which is pivotally secured at 5 to some fixed support. If the link is normally held at one side of the center line 6 which joins the axis of the drum with the pivotal point 5 of the link, when the drum 1 is rotated in the direction of the arrow 7, the friction of the band tends to draw the link toward a line tangential to the upper side of the drum and away from the center line 6, thereby causing the link 4 to tighten the brake band. This is due to the fact that, as the link swings away from the center line 6 it draws the point 3 of the brake band attachment farther away from the axis of the brake drum. The band is therefore tightened by reason of the movement of the link alone and without altering the relation of the attached ends of the band to the link or to each other. On the other hand, if the drum is moved in the direction of the arrow marked 8 the link is automatically drawn by the band friction toward the center line 6, and, the attachment 3 being brought nearer the axis of the drum, the brake band is thereby loosened. This principle I have applied to the construction of the automatic brakes herein shown.

To control or regulate the rotation of the drum in the direction of the arrow 7 it is only necessary to provide means upon the link or other holding member employed such that, in addition to the automatic movement thereof due to the link, the band may be opened or released for movement of the drum in the direction of the arrow 7 by an additional releasing movement of the band upon the link or holding member thereof.

Referring now to the drawings and more particularly to the embodiment of my invention which I have submitted for illustrative purposes, in Figs. 1–4, I have there shown the same as applied to a rope-winding drum 9 or other driven member, the movement of which is to be controlled. A suitably formed drum surface upon the drum is encircled by an appropriate brake band comprising the upper and lower halves 10 and 11. These have adjacent ends fastened together by means of the bolt 12, opposite ends being secured to a brake controlling lever 13 at the points 14 and 15 respectively. The brake lever 13 comprises a pair of suitably shaped and spaced plates pivotally mounted at 16 upon the link 17, the latter being also pivotally secured for swinging movement at 18 upon the fixed support 19. These connections are so selected with reference to the pivotal attachment 16 of the lever to the link and a center line passing from the pivotal center 18 of the link to the axis of the trolley drum, that the band tends to open and release the drum on either tipping movement of the lever above its pivotal attachment (see Fig. 4) or on the mere downward tipping movement of the link 17 (Fig. 3) which causes the latter to approach the said center line and open the band. Assuming the rope or cable which runs off the rope-winding drum to pull in the direction of the arrow shown in Fig. 2, a frictional pull is placed upon the band, the resultant of which will lie approximately (according to the adjustment of the parts) in the direction of the link 17, as represented in Fig. 2, tending to draw the link to the position there shown. This position of the lever and link draws the band about the drum preventing movement of the latter in the direction of the arrow shown and, therefore, preventing the unwinding of the rope. The tendency of the band to open through movement of the lever 13 is resisted by the spring 20, which latter encircles the upright rod 21 between the adjustable nuts 22 and the stirrup 23, which is secured to the lever 13. The spring tends to press the outer end of the lever down toward the adjustable abutting nuts 24 and maintain the necessary tension on the band. The spring is adjustable by means of the nuts 22 so that varying resistance may be offered to the pull of the band thereby regulating the limits of the load under which the brake will slip. The rod 21 is loosely secured to an underlying fixed support so that it may rock back or forth to adapt itself to the movements of the lever 13. The link 17 has rigidly secured thereto a rearwardly extending arm 25 from which depends a bolt 26, the latter carrying at its lower end adjustable nuts 27 between which and a stirrup 28 secured to the lever arm 13 there is a relatively weak spring 29, of sufficient strength, however, to spread apart the outer ends of the lever 13 and the arm 25, thereby to sustain the link and the attached ends of the band approximately in the position shown. As stated, the brake normally assumes the position shown in Fig. 2 preventing the unwinding of the rope. When the drum is turned in the opposite direction, however, the friction on the lower half of the band immediately pulls the link down sufficiently toward the extreme position represented in Fig. 3 to release the band and permit the free rotation of the drum. This occurs automatically on the winding-in movement of the drum. When it is desired to release the band for the unwinding of the rope, the brake-operating rope or cable 30, which may be connected to any suitable controlling lever, is pulled upwardly, raising the outer end of the brake lever 13 against the spring 20, as represented in Fig. 4, and moving the points of attachment of the brake band relatively to each other and upon the link, as shown in Fig. 4, so that the band is loosened and the drum permitted to turn to unwind the rope. This construction of brake differs from automatic brakes with which I have heretofore been familiar, in that the drum is quickly and effectively freed for rotation in the direction represented in Fig. 3, while, at the same time, it is delicately controlled for rotation in the opposite direction (Fig. 4), being capable of release either gradually or completely so that the speed when unwinding may be sensitively governed.

Referring to Figs. 5–8 I have there shown a somewhat simplified form of the same type of brake. In order that the brake may be used for lowering a weight a special brake drum 31 is provided. This is suitably grooved at 32 to receive the tapered friction blocks 33 preferably of wood or other suitable material, which latter are secured radially to the brake band 34 and are preferably cut to present cross grained friction faces to contact with the walls of the drum. To radiate the heat generated by friction when the load is being lowered, the drum is in the form of a rimmed wheel, the walls of the rim being provided at intervals with a number of heat-radiating veins 35. These being located in close proximity to the inner walls of the groove 32 the heat generated by friction is effectively radiated.

The lower half of the brake band is shown as attached at 36 to the brake lever 37, and the upper half at 38 to the said brake lever, the point 38 serving also as the fulcruming attachment of the brake lever 37 to the link or pivoted holding member 39. The end of the brake lever has also secured to it the depending weight 40 which maintains the necessary tension on the brake band. Such weight, however, may be lifted by the controlling rope 41, which, therefore, serves to release the brake and by movement of the brake the releasing lever 37.

The link 39 is pivoted at 42 to the upright ears 43 of the preferably fixed bracket 44, and to the latter there is also pivotally secured at 45 the upright rod 46 which passes up through an opening 47 in the rearwardly extending arm 48 carried by the link 39. Adjusting nuts 49 are provided for the end of the rod 46, and between the latter and the arm 48 there is provided the coiled spring 50 which serves to support the link 39 and the ends of the brake band in its normal position which approximates that shown in Fig. 5, although for purposes of illustration the link is there shown as lying nearer a tangent to the drum than the resultant pull by the band would draw it in practice. Means are also preferably provided, such as the adjusting screw 51, carried by the arm 48 and engaging the base of the bracket 44, whereby the normal position of the link 39 may be regulated at will. A stirrup 52 secured to the brake lever and adapted to engage a projecting portion 53 on the bracket 44 serves to limit the downward movement of the weight and the brake lever.

It will be understood that, while I have herein disclosed for illustrative purposes one specific embodiment of my invention, the same is not limited to the details of the form, or construction, or relative arrangement of parts shown herein, but that extensive deviations may be made from the details herein described without departing from the spirit thereof.

Having thus described my invention, what I claim is:

1. The combination with a rotatable member of a brake therefor, the latter comprising a brake band, a pivotally supported member to which the opposite ends of said band are secured and a second member on which said first member is pivoted, said first member having a releasing movement to effect release of the band independently of the second member, and said second member also having a releasing movement for releasing said band.

2. The combination with a rotatable member, of a brake, the latter comprising a brake band, a pivoted member to which the opposite ends of said band are attached, said member being constantly pressed in a direction to tighten said band and prevent movement of said rotatable member in one direction, means for moving said member about its pivot to release the brake, and means providing for the movement of said pivoted member as a whole to permit the automatic release of the brake for movement of the rotatable member in the opposite direction.

3. A braking device comprising a brake band, a movable body to which the same is frictionally applied, a holding member to which the ends of said band are connected, said member being drawn toward a band-applying position when the said body is moved in one direction and toward a band-releasing position when moved in the opposite direction, and means for moving the attached ends of the band relatively to each other and independently of the movement of said holding member to free the band for rotation of said body in the first-named direction.

4. A braking device comprising a brake band, a pivoted holding member to which its ends are connected, and means for moving the ends of the band relatively to each other independently of the movement of said holding member.

5. In a braking device, the combination with a brake band, of a pivoted link, a member pivoted on said link to which the ends of said band are differentially secured, said link having a movement toward a center line extending from the axis of the link to the axis of the braked member when the latter is turned in one direction, but away from the said center line when the said member is moved in the opposite direction, said link serving to draw the points of brake band attachment farther from the axis of the braked member when moved in said last named direction.

6. In a braking device the combination with a brake band, of a pivoted link to which the ends of the band are connected and adapted by its movement to draw the ends of the brake band toward or away from the axis of the braked member, yieldable means for sustaining said link in a given position, and means for adjusting the position assumed by said link.

7. In a braking device the combination with a brake band of a movable member to which the band is connected, said member being movable to a band clasping position or a band releasing position, according to whether the braked member is rotated in one direction or in the opposite direction, and means for releasing the band while said movable member is maintained in the band clasping position.

8. In a braking device the combination with a brake band and a pivoted link to which the ends of the band are differentially connected, said link being movable from a band releasing position to a band clasping position, without affecting the differential connection of the band.

9. In a braking device the combination with a brake band, of a pivoted link, a member pivotally mounted on said link to which the ends of the band are differentially connected, said link being movable from a band releasing position to a band clasping position to draw the attached ends of the band farther away from the axis of the braked member.

10. The combination with a rotatable member of a brake member, a movable member to which the opposite ends of the brake member are attached, said movable member being constantly pressed in a direction to tighten said brake member and prevent movement of the rotatable member in one direction, means for moving said movable member to release the brake and means providing for its movement as a whole to permit the automatic release of the brake for movement of the rotatable member in the opposite direction.

11. The combination with a rotatable member of a brake member, a movable member to which the opposite ends of the brake member are differentially secured, means for moving the latter member to tighten the brake, and means providing for the reversal of movement of said rotatable member to shift the said movable member as a whole and thereby release the brake.

12. The combination with a rotatable member of a brake member, a pivoted lever to which the opposite ends of the brake member are differentially attached, said member being constantly pressed in a direction to tighten said brake member and prevent movement of the rotatable member in one direction, means for moving the lever to release the brake, and a pivotally mounted link on which said lever is pivoted, said link providing for the movement of the lever as a whole to permit the automatic release of the brake for movement of the rotatable member in the opposite direction.

In testimony whereof, I have signed my name to this specification, in the presence of two subscribing witnesses.

ALMON E. NORRIS.

Witnesses:
THOMAS B. BOOTH,
ROBERT H. KAMMLER.